(12) United States Patent
Takahashi et al.

(10) Patent No.: US 8,855,944 B2
(45) Date of Patent: Oct. 7, 2014

(54) WHEEL BEARING WITH SENSOR

(75) Inventors: Toru Takahashi, Iwata (JP); Hiroshi Isobe, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 521 days.

(21) Appl. No.: 12/736,412

(22) PCT Filed: Apr. 7, 2009

(86) PCT No.: PCT/JP2009/001610
§ 371 (c)(1),
(2), (4) Date: Dec. 23, 2010

(87) PCT Pub. No.: WO2009/125583
PCT Pub. Date: Oct. 15, 2009

(65) Prior Publication Data
US 2011/0125421 A1 May 26, 2011

(30) Foreign Application Priority Data

Apr. 10, 2008 (JP) .................. 2008-102133
Apr. 1, 2009 (JP) .................. 2009-088788

(51) Int. Cl.
| | |
|---|---|
| *G01L 3/00* | (2006.01) |
| *B60B 27/00* | (2006.01) |
| *F16C 19/52* | (2006.01) |
| *G01L 5/00* | (2006.01) |
| *F16C 19/18* | (2006.01) |

(52) U.S. Cl.
CPC ........... *G01L 5/0019* (2013.01); *B60B 27/0068* (2013.01); *B60B 27/0094* (2013.01); *B60B 27/0005* (2013.01); *F16C 19/522* (2013.01); *F16C 19/186* (2013.01)
USPC .............. 702/42; 384/448; 384/544; 384/589

(58) Field of Classification Search
CPC ...................................... F16C 19/522
USPC ............................ 702/42; 384/448, 544, 589
See application file for complete search history.

(56) References Cited

U.S. PATENT DOCUMENTS 4,341,122 A   7/1982  Lechler et al.
4,693,494 A * 9/1987  Buma et al. ................ 280/5.516
(Continued)

FOREIGN PATENT DOCUMENTS

EP   2006653 A1 * 12/2008
JP   62-49568     10/1987
(Continued)

OTHER PUBLICATIONS

Chinese Office Action mailed Dec. 26, 2011 issued in related Chinese Patent Application No. 200980104899.9.
(Continued)

*Primary Examiner* — John Breene
*Assistant Examiner* — Yaritza H Perez Bermudez
(74) *Attorney, Agent, or Firm* — Staas & Halsey LLP (57) ABSTRACT

A sensor-equipped wheel support bearing assembly capable of accurately detecting the load acting on the bearing assembly is provided. The sensor-equipped wheel support bearing assembly includes a sensor unit in an outer member that serves as a stationary member. The sensor unit includes a strain generating member, having two or more contact fixing segments to be fixed to the stationary member, and two or more sensors for detecting strain in the strain generating member. The contact fixing segments are spaced from each other in a direction circumferentially of the stationary member at the same axial positions. An estimating section is provided in the bearing assembly for estimating load thereon based on the difference between respective output signals from the sensors by calculating amplitudes of the output signals or values corresponding to such amplitudes from the difference between the respective output signals.

12 Claims, 8 Drawing Sheets

(56) References Cited

U.S. PATENT DOCUMENTS

| | | | |
|---|---|---|---|
| 4,996,882 | A | 3/1991 | Kistler |
| 6,619,102 | B2 | 9/2003 | Salou et al. |
| 6,634,208 | B2 | 10/2003 | Salou et al. |
| 6,971,799 | B2 | 12/2005 | Sato et al. |
| 7,197,387 | B2 | 3/2007 | Inoue et al. |
| 7,882,752 | B2 | 2/2011 | Ozaki et al. |
| 8,167,497 | B2 | 5/2012 | Ozaki et al. |
| 2002/0012484 | A1 | 1/2002 | Salou et al. |
| 2002/0061148 | A1 | 5/2002 | Salou et al. |
| 2003/0218548 | A1 | 11/2003 | Sato et al. |
| 2005/0222740 | A1 | 10/2005 | Inoue et al. |
| 2006/0153482 | A1* | 7/2006 | Koike et al. ............ 384/448 |
| 2007/0074587 | A1 | 4/2007 | Mol et al. |
| 2009/0038414 | A1 | 2/2009 | Ozaki et al. |
| 2009/0097791 | A1 | 4/2009 | Ozaki et al. |
| 2009/0114004 | A1 | 5/2009 | Ozaki et al. |
| 2010/0135604 | A1 | 6/2010 | Ozaki et al. |

FOREIGN PATENT DOCUMENTS

| | | |
|---|---|---|
| JP | 63-256832 | 10/1988 |
| JP | 4-39553 | 9/1992 |
| JP | 2002-98138 | 4/2002 |
| JP | 2003-530565 | 10/2003 |
| JP | 2004-3601 | 1/2004 |
| JP | 2004-514900 | 5/2004 |
| JP | 2006-119000 | 5/2006 |
| JP | 2006-170352 | 6/2006 |
| JP | 2007-57299 | 3/2007 |
| JP | 2007-057302 | 3/2007 |
| JP | 2007-292158 | 11/2007 |
| WO | 01/77634 A2 | 10/2001 |
| WO | 02/44678 A1 | 6/2002 |
| WO | 2004/018273 | 3/2004 |
| WO | WO 2007/018072 | 2/2007 |
| WO | WO 2007/066593 | 6/2007 |
| WO | 2007/105367 A1 | 9/2007 |
| WO | WO 2007105367 A1 * | 9/2007 |

OTHER PUBLICATIONS

Chinese Office Action dated Nov. 25, 2011 issued in related Chinese Patent Application No. 200880117200.8.
International Preliminary Report on Patentability mailed Oct. 14, 2010 in a possible related International Patent Application PCT/JP2009/000524.
International Preliminary Report on Patentability mailed Jun. 17, 2010 in a possible related International Patent Application PCT/JP2008/003398.
International Preliminary Report on Patentability mailed Dec. 9, 2010 in the corresponding International Patent Application PCT/JP2009/001610.
European Search Report dated Feb. 27, 2012 issued in related European Patent Application No. 09711226.2.
Chinese Office Action issued Apr. 19, 2012 in related Chinese Patent Application No. 200980104899.9.
Japanese Office Action mailed Jul. 3, 2012 issued in related Japanese Patent Application No. 2008-033996.
Japanese Office Action mailed May 29, 2012 issued in related Japanese Patent Application No. 2007-305302.
Japanese Office Action mailed May 29, 2012 issued in related Japanese Patent Application No. 2007-305300.
U.S. Appl. No. 12/734,826, filed May 26, 2010, Isobe et al., NTN Corporation.
U.S. Appl. No. 12/735,700, filed Aug. 10, 2010, Takahashi et al., NTN Corporation.
International Search Report for PCT/JP2009/001610, mailed Jun. 30, 2009.
Japanese Office Action issued Sep. 4, 2012 in related Japanese Patent Application No. 2007-305302.
Chinese Office Action issued Aug. 30, 2012 in related Chinese Patent Application No. 200880117200.8.
U.S. Office Action issued Aug. 10, 2012 in related U.S. Appl. No. 12/734,826.
U.S. Notice of Allowance issued Nov. 13, 2012 in copending U.S. Appl. No. 12/734,826.
U.S. Office Action issued Dec. 13, 2012 in copending U.S. Appl. No. 12/735,700.
U.S. Office Action issued May 9, 2013 in copending U.S. Appl. No. 12/735,700.
European Search Report issued Jul. 24, 2013 in corresponding European Patent Application No. 08855199.9.
Japanese Office Action mailed Feb. 26, 2013 for corresponding Japanese Application No. 2009-088788.
Chinese Office Action mailed Feb. 28, 2013 for corresponding Chinese Application No. 200880117200.8.

* cited by examiner

WHEEL BEARING WITH SENSOR

CROSS REFERENCE TO THE RELATED APPLICATIONS

This application claims the benefit under 35 U.S.C. Section 371, of PCT International Application No. PCT/JP2009/001610, filed Apr. 7, 2009, which claimed priority to Japanese patent applications No. 2008-102133, filed Apr. 10, 2008, and No. 2009-088788, filed Apr. 1, 2009, the entire disclosures of which are herein incorporated by reference as a part of this application.

BACKGROUND OF THE INVENTION

1. Field of the Invention

The present invention relates to a wheel bearing with sensor, more specifically a sensor-equipped wheel support bearing assembly of a kind having a load sensor incorporated in a bearing unit of a vehicle wheel for detecting a load imposed thereon.

2. Description of the Related Art

As a technique for detecting a load imposed on each of vehicle wheels of an automotive vehicle, a sensor-equipped wheel support bearing assembly has been suggested, in which a strain induced in a flange outer diametric surface of an outer ring that serves as a stationary ring of the bearing assembly, is detected. (See, for example, the Patent Document 1 listed below.) The sensor-equipped wheel support bearing assembly of a type, in which a strain gauge is pasted to an outer ring of the bearing assembly for detecting the strain, has also been suggested. (See, for example, the Patent Document 2 listed below.)

In addition, the sensor-equipped wheel support bearing assembly has yet been suggested, in which a sensor unit, made up of a strain generating member and a strain sensor fitted to this strain generating member, is fixed to a stationary ring of the bearing assembly and in which the strain generating member has at least two contact fixing segments adapted to be fixed to the stationary ring and also has a cutout portion, at least one location, between the neighboring contact fixing segments, with the strain sensor arranged in this cutout portion. (See, for example, the Patent Document 3 listed below.)

According to the sensor-equipped wheel support bearing assembly disclosed in the Patent Document 3 referred to above, when a load is imposed on a rotating ring incident to travel of the automotive vehicle, the stationary ring deforms through rolling elements and such deformation in turn brings about a strain in the sensor unit. The strain sensor provided in the sensor unit detects a strain induced in the sensor unit. By determining the relation between the strain and the load by means of a series of experiments and/or simulations in advance, the load acting on a vehicle wheel can be detected from an output of the strain sensor.

[Patent Document 1] JP Laid-open Patent Publication No. 2002-098138
[Patent Document 2] JP Laid-open Patent Publication No. 2003-530565
[Patent Document 3] JP Laid-open Patent Publication No. 2007-057299

SUMMARY OF THE INVENTION

According to the technique disclosed in the Patent Document 1 referred to above, arrangement has been made to detect the strain generated as a result of deformation of a flange portion of the stationary ring. This technique, however, has such a problem that the deformation of the flange portion of the stationary ring tends to be accompanied by a hysteresis occurring in an output signal since a slippage occurs between a flange surface and a knuckle surface when a force exceeding the stationary frictional force acts.

For example, if the load acting on the wheel support bearing assembly in a certain direction becomes large, no slippage occurs at first between the stationary ring flange surface and the knuckle surface because the stationary frictional force is larger than the load, but in the event that the load exceeds a certain magnitude, it overcomes the stationary frictional force, resulting in slippage. When an attempt is made to estimate the load at a portion where the deformation takes place, the hysteresis appears in the output signal. Once this hysteresis appears, the detecting resolution will be lowered.

Also, in the case where the strain gauge is pasted to the outer ring such as disclosed in the Patent Document 2 referred to above, a problem has been found in assemblability. On the other hand, in the case of the sensor-equipped wheel support bearing assembly disclosed in the Patent Document 3 referred to above, each time rolling elements of the wheel support bearing assembly successively pass in the vicinity of the site where the sensor unit is disposed, the amplitude of an output signal from the sensor unit fluctuates. In addition, where the load is to be estimated based on the average value of the output signals, the detecting accuracy tends to be lowered since it is apt to be affected by influences brought about by temperature and/or slippage taking place between the knuckle and the flange surface.

An object of the present invention is to provide a sensor-equipped wheel support bearing assembly of a type capable of accurately detecting the load acting on the wheel support bearing assembly and/or a tire tread surface without being adversely affected by those influences brought about by temperature and/or slippage between the knuckle and the flange surface.

In order to accomplish the foregoing object, the sensor-equipped wheel support bearing assembly in accordance with the present invention for rotatably supporting a vehicle wheel relative to a vehicle body structure, which assembly includes an outer member having an inner periphery formed with a plurality of rolling surfaces; an inner member having an outer periphery formed with rolling surfaces opposed respectively to the rolling surfaces of the outer member; and a plurality of rows of rolling elements each row interposed between the first and rolling surfaces in the outer and inner members; at least one load detecting sensor unit provided in one of the outer member and the inner member that serves as a stationary member, the load detecting sensor unit including a strain generating member, having two or more contact fixing segments fixed to the stationary member in contact therewith, and two or more sensors fitted to the strain generating member for detecting the strain induced in the strain generating member, the two or more contact fixing segments being so arranged as to be spaced from each other in a direction circumferentially of an outer diametric surface of the stationary member at a same axial position; and an estimating section for estimating a load acting on the wheel support bearing assembly based on a difference between respective output signals from the two or more sensors.

When a load acts on the wheel support bearing assembly and/or between a wheel tire on the vehicle wheel and the road surface, such load is also applied to the stationary member (for example, the outer member) of the wheel support bearing assembly, resulting in deformation of the stationary member. The load is then detected by the sensor unit from such deformation. Although the respective output signals of the two or more sensors forming respective parts of the sensor unit are affected by passage of the rolling elements, the estimating section estimates, based on the difference between those output signals of the sensors, a force (a vertically acting load Fx, a load Fy, which will become a driving force or a braking force, and an axially acting force Fy) acting on the wheel support bearing assembly and/or between the vehicle wheel and the road surface (tire tread surface) and, therefore, influences brought about by the temperature and appearing in the respective output signals of the two or more sensors and the influences brought about by slippage between the knuckle and the flange surface can be counterbalanced. Accordingly, without being affected by the influences brought about by the temperature and the influences brought about by the slippage between the knuckle and the flange surface, the load (the vertical load Fz, the load Fx due to become the driving force or the braking force and the axial load Fy) acting on the wheel support bearing assembly and/or between the vehicle wheel tire and the road surface can be detected accurately.

In one embodiment of the present invention, the estimating section referred to above may be capable of calculating amplitudes of respective output signals of the two or more sensors or values equivalent to those amplitudes from the difference between the respective output signals of the two or more sensors.

The amplitude of each of the output signals tends to be affected by not only by the position of the rolling elements and the passage of the rolling elements, but also the influences brought about by temperature and slippage taking place between the knuckle and the flange surface. Accordingly, by calculating from the difference between the respective output signals of the two or more sensors, the amplitude of each of those output signals or the value equivalent to such amplitude, the influences brought about by the temperature and/or the influence brought about by the slippage taking place between the knuckle and the flange surface, both of which would affect on at least each of those output signals, can be counterbalanced to thereby increase the detecting accuracy.

In one embodiment of the present invention, the estimating section referred to above may be capable of generating an absolute value of the signals from the difference between the output signals to utilize a peak value or a direct current component of the absolute value as the value equivalent to the amplitude of the respective output signal.

Alternatively, the estimating section referred to above may be of a type capable of calculating an effective value of the signals from the difference between the output signals to utilize the effective value as the value equivalent to the amplitude of the respective output signal.

Yet alternatively, the estimating section referred to above may be capable of determining, from the difference between the output signals, a maximum and a minimum values within a time span of one or more cycles of vibration period, to obtain the value equivalent to the amplitude of the respective output signal based on the maximum value and the minimum value.

In one embodiment of the present invention, distance between two contact fixing segments of those two or more contact fixing segments, which are positioned on respective ends of a circumferential row on an outer diametric surface of the stationary member may be equal to a pitch of arrangement of the rolling elements.

In the case of this construction, positioning of, for example, the two sensors at a position intermediate of the contact fixing segments at the opposite ends of the circumferential row is effective to render the distance between those sensors in the circumferential direction to be about ½ of the pitch of arrangement of the rolling elements. As a result, the respective output signals of those sensors have about 180° phase difference with each other and the difference thereof will represent an accurate value, in which the influences brought about by temperature and/or the influence brought about by the slippage between the knuckle and the flange surface are assuredly eliminated.

In one embodiment of the present invention, distance between neighboring sensors of the two or more sensors in a circumferential direction of the outer diametric surface of the stationary member is chosen to be [½+n] (where n represents an integer) times a pitch of arrangement a the rolling elements or an approximation to such value.

When the distance between those two sensors in the circumferential direction is ½ of the pitch of arrangement of the rolling elements, the respective output signals of those sensors will have a 180° phase difference with each other and such difference will be an accurate value, in which the influence brought about by temperature and/or the influence brought about by the slippage between the knuckle and the flange surface have been counterbalanced. Accordingly; the force estimated by the estimating section and acting on the wheel support bearing assembly and/or between the vehicle wheel and the road surface will be an accurate value, from which the influence brought about by temperature and/or the influence brought about by the slippage between the knuckle and the flange surface have been deleted.

In one embodiment of the present invention, the sensor unit may include first, second and third contact fixing segments in the strain generating member and two sensors, those two sensors being fitted to a portion of the strain generating member between the neighboring first and second contact fixing segments and a portion of the strain generating member between the neighboring second and third contact fixing segments, respectively.

In the case of this construction, if the distance between the two contact fixing segments (first and third fixing segments), positioned on the opposite ends in the circumferential direction is chosen to be equal to the pitch of arrangement of the rolling elements, the distance between the neighboring two sensors in the circumferential direction will be ½ of the pitch of the arrangement of the rolling elements. Accordingly, the force estimated by the estimating section and acting on the wheel support bearing assembly and/or between the vehicle wheel and the road surface will be an accurate value, from which the influence brought about by temperature and/or the influence brought about by the slippage between the knuckle and the flange surface have been deleted.

In one embodiment of the present invention, distance between the neighboring contact fixing segments or the neighboring sensors in a circumferential direction of the outer diametric surface of the stationary member may be chosen to be [½+n] (where n represents an integer) times a pitch of arrangement a the rolling elements or an approximation to such value. Even in this construction, due to the difference between the respective output signals of the sensors, the influence brought about by temperature and/or the influence brought about by the slippage between the knuckle and the flange surface can be deleted.

In one embodiment of the present invention, the strain generating member may be prepared from a plate material having a generally strip shape in a plain view and having a cutout portion defined at a side edge portion thereof.

Where the strain generating member is constructed from the thin plate of a uniform width or of a strip shaped configuration having its opposite side edge portions formed with cutout portions, the strain generating member can be rendered to be compact and low in cost.

In one embodiment of the present invention, the sensor units are disposed at top and bottom surface regions, and right and left surface regions of the outer diametric surface of the stationary member, which are located respectively in a vertical and horizontal directions relative to a tire tread surface. In the case of this construction, the load acting in a plurality of directions can be estimated. In other words, the vertically acting load Fz and the axial load Fy can be estimated from the two sensor units, which are disposed at the upper and lower surface regions of the outer diametric surface of the stationary member whereas the load Fx due to the driving force or the braking force can be estimated from the output signals of the two sensor units which are disposed at the right and left surface regions of the outer diametric surface of the stationary member.

In one embodiment of the present invention, the estimating section may be capable of estimating the load acting on the wheel support bearing assembly further by the utilization of the sum of respective output signals of the two or more sensors.

When the respective output signals of the two or more sensors are summed together, influences brought about by the position of the rolling elements, which appear in each of those output signals, can be counterbalanced and, therefore, the load can be estimated even a halted condition. In view of the fact that the influence brought about by temperature and the influences brought about by the slippage between the knuckle and the flange surface can be eliminated, the load can be detected further accurately and, since the use of a low pass filter is dispensed with, the response speed can also be increased.

In one embodiment of the present invention, the sensor unit may include the three contact fixing segments and the two sensors; and the three contact fixing segments may be disposed at respective positions spaced in the circumferential direction at the same axial position on the outer diametric surface of the stationary member, and distance between the neighboring contact fixing segments or the neighboring sensors in a circumferential direction of the outer diametric surface of the stationary member may be chosen to be [½+n] (where n represents an integer) times a pitch of arrangement a the rolling elements or an approximation to such value.

According to this construction, since the influences brought about by temperature and the influences brought about by the slippage between the knuckle and the flange surface can be counterbalanced due to the difference between the respective output signals of the two sensors, the load acting on the wheel support bearing assembly and/or between the wheel tire and the road surface can be accurately detected without being affected by those influences.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A first embodiment of the present invention will be hereinafter described in detail with particular reference to FIGS. 1 to 9. This first embodiment is directed to an inner ring rotating model of a third generation type and is applied to a wheel support bearing assembly for the support of a vehicle drive wheel. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

Figure 1:
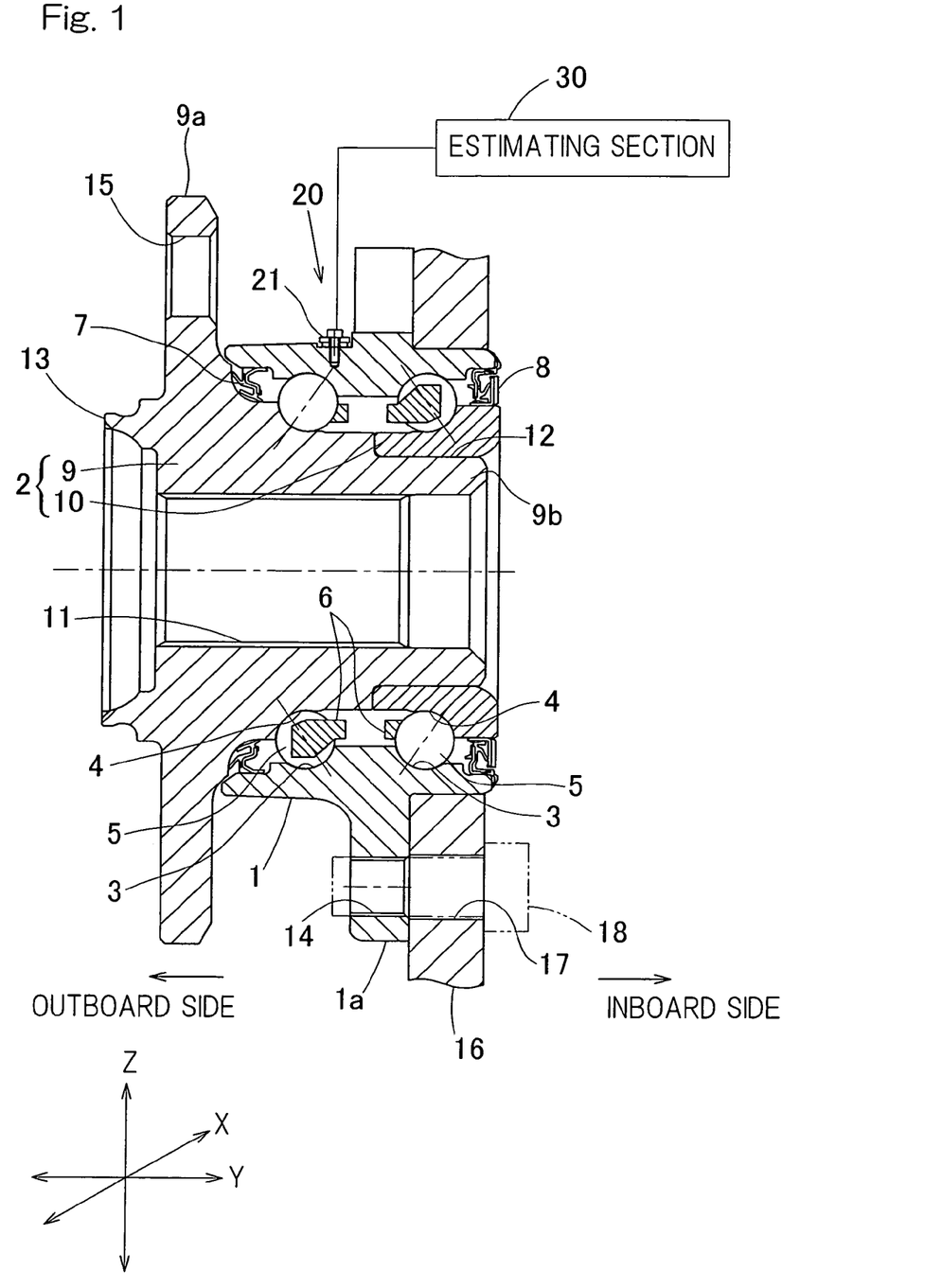
FIG. 1 is a diagram showing a sectional view of a sensor-equipped wheel support bearing assembly according to an embodiment of the present invention and a block diagram showing a conceptual construction of a detecting system therefor.

A bearing unit in this wheel support bearing assembly includes, as shown in FIG. 1 in a sectional view, an outer member 1 having an inner periphery formed with a plurality of rolling surfaces 3, an inner member 2 having an outer periphery formed with rolling surfaces 4 in face-to-face relation with the respective rolling surfaces 3, and a plurality of rows of rolling elements 5 interposed between the plurality of those rolling surfaces 3 and 4. This wheel support bearing assembly is rendered to be a double row angular contact ball bearing design, in which the rolling elements 5 are employed in the form of balls and retained by a retainer 6 employed for each of the rows. The rolling surfaces 3 and 4 referred to above have a sectional shape representing an arcuate shape and are so formed as to permit the ball contact angles to assume a back-to-back relation to each other. Opposite ends of a bearing space delimited between the outer member 1 and the inner member 2 are sealed respectively by sealing devices 7 and 8.

The outer member 1 is of a type that serves as a stationary member and is of one piece construction including a vehicle body fitting flange 1a defined in an outer periphery thereof and adapted to be secured to a knuckle 16 of a suspension system (not shown) of an automotive vehicle. The vehicle body fitting flange 1a has knuckle fitting bolt holes 14 defined therein at a plurality of locations spaced in a direction circumferentially thereof and, therefore, the vehicle body fitting flange 1a can be secured to the knuckle 16 when knuckle bolts 18 inserted from an inboard side into respective bolt insertion holes 17 defined in the knuckle 16 are threaded into the corresponding bolt holes 14.

The inner member 2 is of a type that serves as a rotating member and includes a hub unit 9 having a wheel mounting hub flange 9a formed therein, and an inner ring 10 mounted on an outer periphery of an inboard end of a hub unit 9b of the hub unit 9. The rolling surfaces 4 referred to above are formed respectively in the hub unit 9 and the inner ring 10. An outer periphery of an inboard end of the hub unit 9 is provided with an inner ring mounting surface 12 that is stepped radially inwardly to render it to have a reduced diameter, with the inner ring 10 mounted on this inner ring mounting surface 12. The hub unit 9 has a center portion formed with a throughhole 11 extending completely therethrough. The hub flange 9a is provided with a plurality of press fitting holes 15 defined at respective circumferential locations, spaced in a direction circumferentially thereof, for receiving corresponding hub bolts (not shown). In a periphery of a root portion of the hub flange 9a of the hub unit 9, a cylindrical pilot portion 13 for guiding a vehicle wheel and a brake component protrudes (not shown) towards the outboard side.

Figure 2:
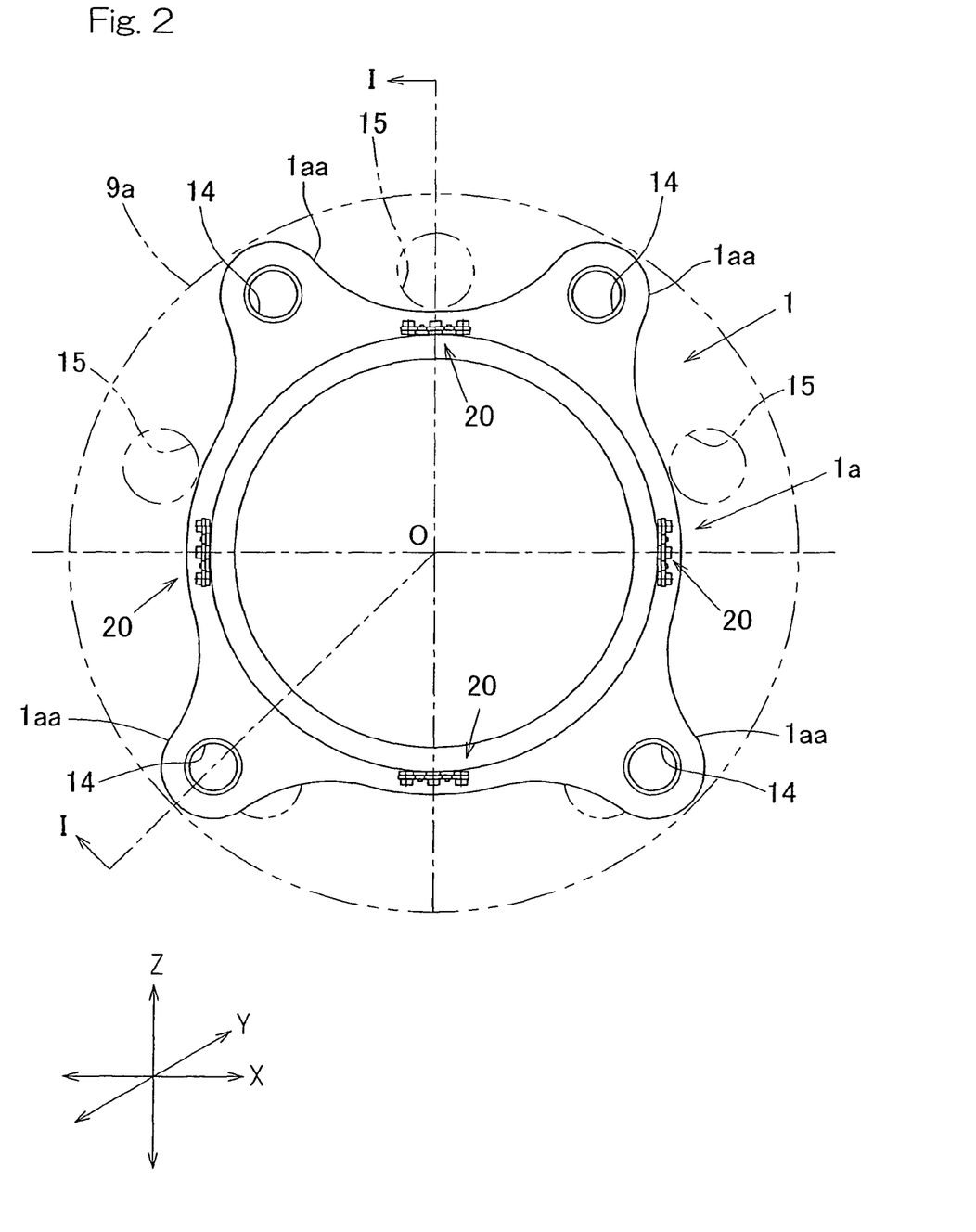
FIG. 2 is a front elevational view of an outer member of the sensor-equipped wheel support bearing assembly as viewed from the outboard side.

FIG. 2 illustrates a front elevational view showing the outer member 1 of the wheel support bearing assembly as viewed from the outboard side. It is to be noted that FIG. 1 illustrates a cross sectional view taken along the arrow headed line I-I in FIG. 2. As best shown in FIG. 2, the vehicle body fitting flange 1a referred to previously has projecting lugs 1aa at respective circumferential locations where the corresponding bolt holes 14 are defined, which protrude in a direction radially outwardly beyond the remaining area.

The outer member 1, which serves as a stationary member, has an outer diametric surface provided with four sensor units 20. In the instance as shown, those sensor units 20 are provided on top and bottom surface regions of the outer diametric surface of the outer member 1, which lie at upper and lower positions in a vertical direction relative to the tire tread surface, respectively, and left and right surface regions of the same outer diametric surface of the outer member 1, which lie at left and right positions in a horizontal direction relative to the tire tread surface.

Figure 3:
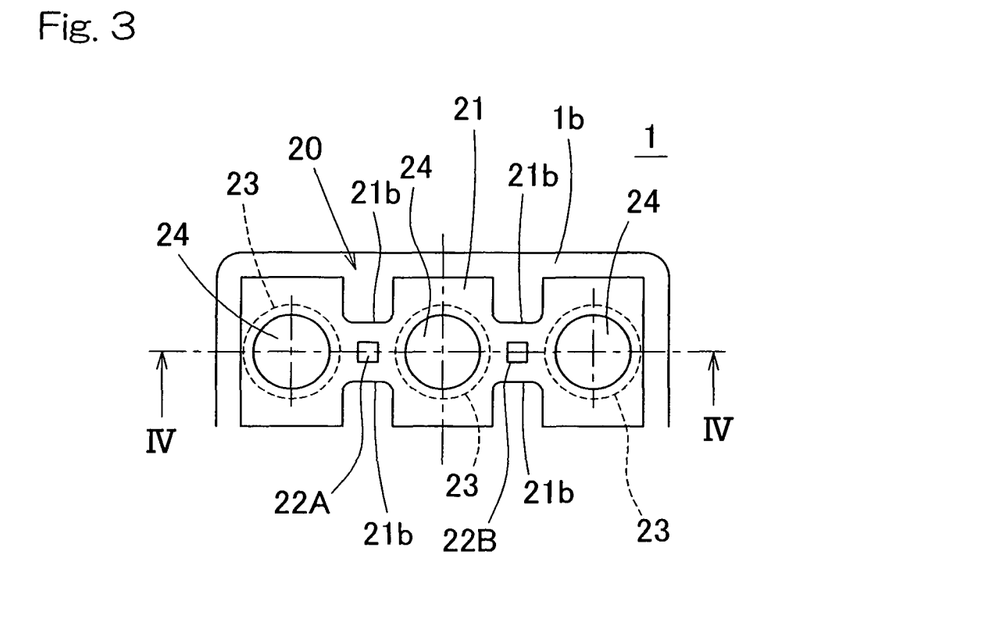
FIG. 3 is an enlarged top plan view showing a sensor unit employed in the sensor-equipped wheel support bearing assembly.
Figure 4:
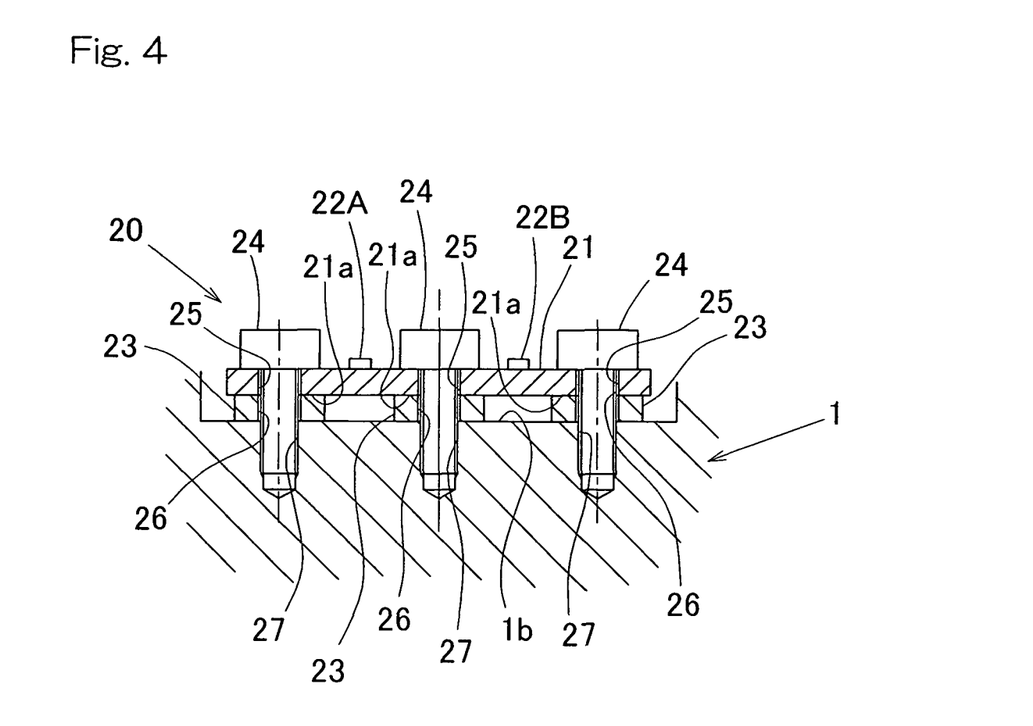
FIG. 4 is a cross sectional view taken along the line IV-IV in FIG. 3.

Each of those sensor units 20 includes, as shown in an enlarged top plan view and an enlarged sectional view shown respectively in FIGS. 3 and 4, a strain generating member 21 and two or more, for example, two as shown, sensors 22 fitted to the strain generating member 21 for detecting a strain induced in the strain generating member 21. The strain generating member 21 is in the form of an elastically deformable thin metallic plate having a wall thickness not greater than 2 mm such as, for example, a steel plate and has a strip shape in a plan view having a width uniform over the entire length thereof, having its opposite side edge portion formed with cutout portions 21b. Each of those cutout portions has its corner areas so shaped as to represent an arcuate shape in section.

The strain generating member 21 in each of the sensor units 20 has two or more (for example, three in the instance as shown) contact fixing segments 21a defined therein and adapted to be fixed to the outer diametric surface of the outer member 1 through respective spacers 23 in contact therewith. Those three contact fixing segments 21a are arranged in a row extending in a lengthwise direction of the strain generating member 21. The two strain sensors 22 in each of the sensor units 20 are disposed at respective locations of the strain generating member 21, where large strain is induced by the load acting in various direction of the strain generating member 21. More specifically, those two strain sensors 22 are disposed on respective portions of an outer surface of the strain generating member 21 between the neighboring contact fixing segments 21a. In other words, referring to FIG. 4, one strain sensor 22A of the strain sensors 22 is fitted to a portion of the strain generating member 21 between the left contact fixing segment 21a and the intermediate contact fixing segment 21a and the other strain sensor 22B of the strain sensors 22 is fitted to a portion of the strain generating member 21 between the intermediate contact fixing segment 21a and the right contact fixing segment 21a.

The cutout portions 21b are, as best shown in FIG. 3, formed at two locations of the opposite side edge portions of the strain generating members 21, which are aligned with respective sites where the strain sensors 22 are disposed. Accordingly, the strain sensors 22 are operable to detect the strain induced in the vicinity of the cutout portions 21b in the strain generating member 21 in the direction lengthwise of the strain generating member 21.

It is to be noted that the strain generating member 21 is preferably of a type incapable of deforming plastically even when the maximum expected force is applied as a force acting on the outer member 1, which serves as the stationary member, or as a working force acting between the vehicle tire and the road surface. This is because once the plastic deform occurs in the strain generating member 21, the deformation of the outer member 1 will not be transmitted to the sensor unit 20, with the strain measurement being consequently affected adversely.

The sensor unit 20 referred to above is so positioned that the three contact fixing segments 21a of the strain generating member 21 thereof are spaced in a direction circumferentially of the outer member 1 from each other at respective positions of the same dimension in a direction axially of the outer member 1, and those contact fixing segments 21a of the strain generating member 21 so positioned as described above are fixed to the outer diametric surface of the outer member 1 through the associated spacers 23 by means of bolts 24. Those bolts 24 are, after having been passed through bolt insertion holes 25, defined in the respective contact fixing segments 21, again passed through corresponding bolt insertion holes 26, defined in the respective spacers 23, threadingly engaged in bolt holes 27 defined in an outer peripheral portion of the outer member 1.

With the contact fixing segments 21a having been fixed to the outer diametric surface of the outer member 1 through the respective spacers 23 as hereinabove described, portions of the strain generating members 21 made of the thin plate configuration, where the associated cutout portions 21b are formed, are held in position spaced from the outer diametric surface of the outer member 1 and, accordingly, a deformation induced by strain may occur easily in the vicinity of those cutout portions 21b. For the axial position where each of the contact fixing segments 21a is arranged, an axial position in the vicinity of the rolling surface 3 of the outboard row may be selected. The vicinity of the rolling surface 3 of the outboard row referred to above means a region ranging from a middle position between the rolling surface 3 of the inboard row and the rolling surface 3 of the outboard row, to an area in which the rolling surface 3 of the outboard row is formed. In order for the sensor unit 20 to be stably fixed to the outer diametric surface of the outer member 1, an area of the outer diametric surface of the outer member 1, on which the respective spacer 23 is fixed in contact therewith, is formed as a flat surface area 1b.

Figure 5:
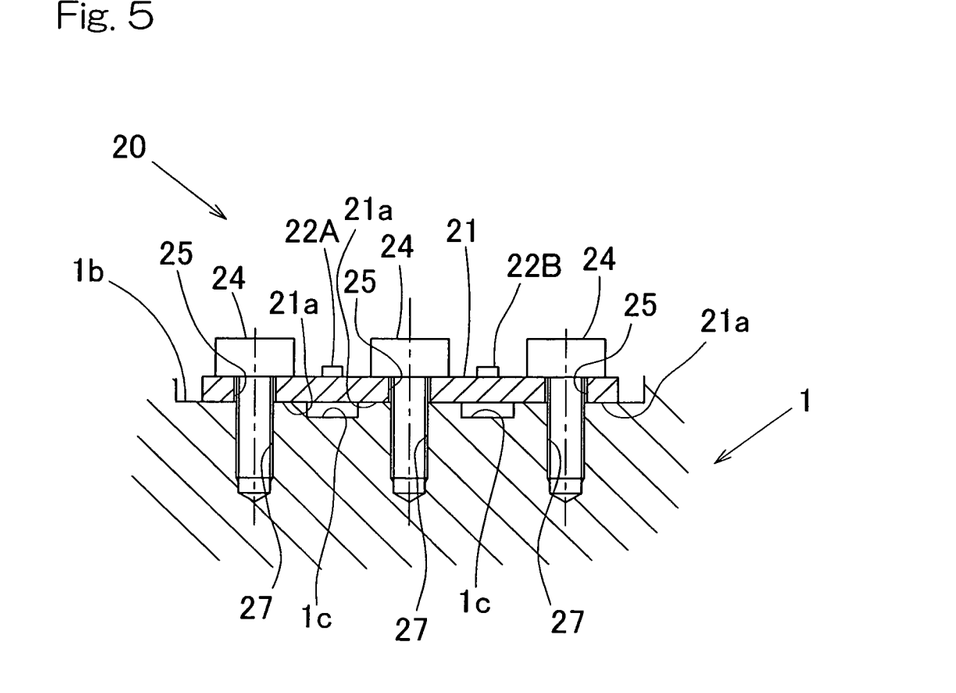
FIG. 5 is a sectional view showing an example of a different installation of the sensor unit.

Alternatively, as shown in a sectional view in FIG. 5, the outer diametric surface of the outer member 1 may have a groove 1c defined therein at a location intermediate between the two locations, each at which the neighboring contact fixing segments 21a of the strain generating member 21 are fixed, so that the use of the respective spacer 23 may be dispensed with and the portions of the strain generating member 21 in which the cutout portions 21b are formed, may be spaced from the outer diametric surface of the outer member 1.

For each of the sensors 22, any of various sensors may be employed. For example, the sensor 22 may be constructed in the form of a metal foil strain gauge. In such case, it is fixed to the strain generating member 21 by means of bonding. Also, the strain sensor 22 may be constructed in the form of a thick film resistance element on the strain generating member 21.

The two sensors 22 of the sensor unit 20 are connected with a estimating section 30. The estimating section 30 calculates the force (the vertical load Fz, the load Fx due to become the driving force or the braking force, and the axial load Fy) acting in the wheel support bearing assembly and/or between the vehicle wheel tire and the road surface (tire tread surface) on the basis of the difference between respective output signals (more specifically, amplitudes of respective output signals) from the two strain sensors 22 of the sensor unit 20. This estimating section 30 includes a relation setting circuit (not shown), in which the relation between the vertical load Fz, the load Fx due to become the driving force or the braking force, and the axial load Fy and the difference between the respective output signals of the two strain sensors 22 is set in terms of arithmetic equations or tables, and is operable to estimate the working force (the vertical load Fz, the load Fx due to become the driving force or the braking force, and the axial load Fy) from the difference between the respective output signals of the two strain sensors 22 with the utilization of the relation setting circuit referred to above. Contents preset in the relation setting circuit are set by means of a series of experiments and/or simulations conducted beforehand.

Figure 6A:
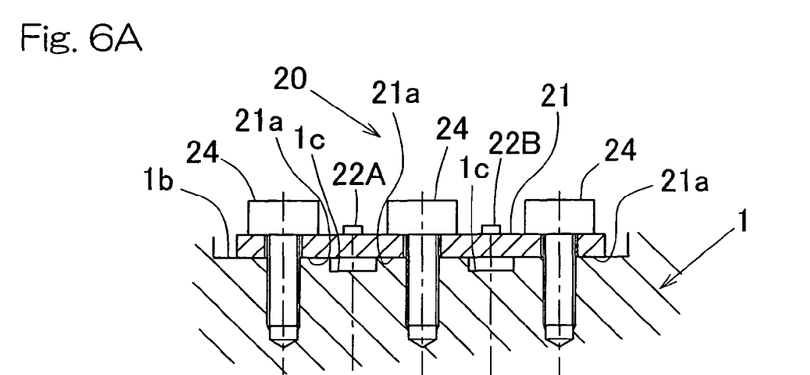
FIG. 6A is an explanatory diagram used to explain a manner of an output signal of the sensor unit being affected by the position of rolling elements.
Figure 6B:
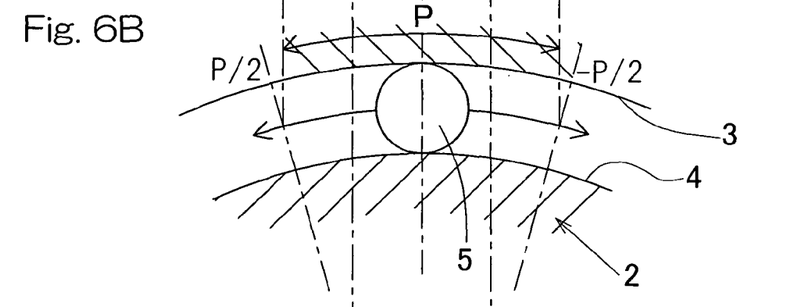
FIG. 6B is an explanatory diagram used to explain a manner of an output signal of the sensor unit being affected by the position of rolling elements.
Figure 6C:
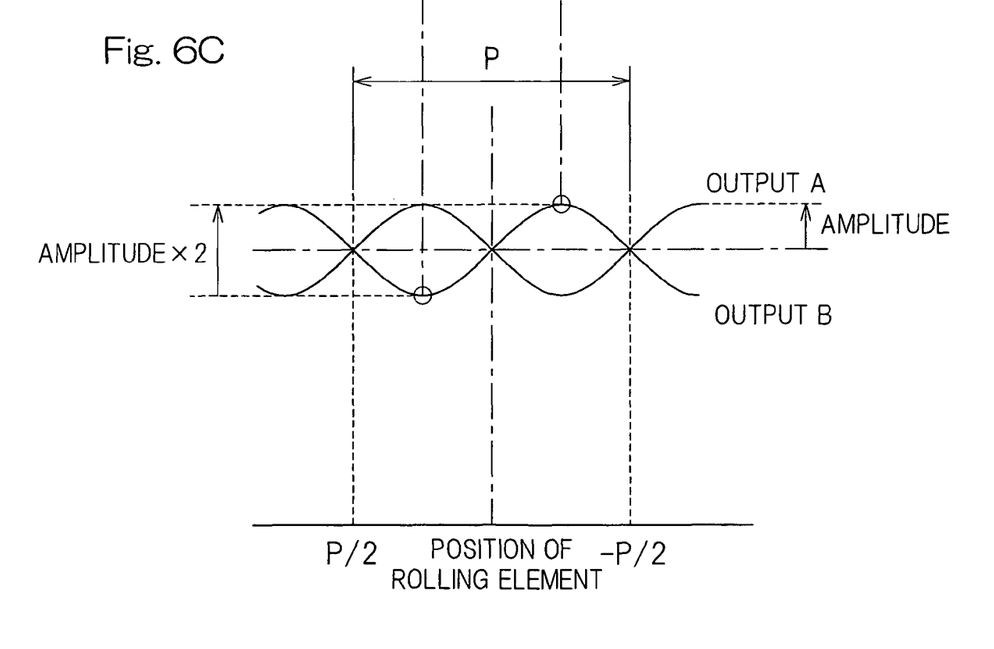
FIG. 6C is an explanatory diagram used to explain a manner of an output signal of the sensor unit being affected by the position of rolling elements.

Since each of the sensor unit 20 is disposed at the axial position in the vicinity of the rolling surface 3 of the outboard row in the outer member 1, respective output signals A and B of the strain sensors 22A and 22B are affected by the rolling elements 5 moving proximate to the site where the respective sensor unit 20 is disposed as shown in FIGS. 6A to 6C. Also, even at the halt of the wheel support bearing assembly, the respective output signals A and B of the strain sensors 22A and 22B are affected by the position of the rolling elements 5. In other words, when the rolling elements 5 move past the position closest to the strain sensors 22A and 22B of the respective sensor unit 20 (or when the rolling elements 5 are held at such position), the respective output signals A and B of the strain sensors 22A and 22B attain the maximum value, and as the rolling elements 5 move a distance away from such position (or when the rolling elements 5 are held at a position distant from such position) as shown in FIGS. 6A and 6B, the respective output signals A and B of the strain sensors 22A and 22B decrease. Since at the time the wheel support bearing assembly is rotating, the rolling elements 5 move successively in the vicinity of the site of installation of the sensor unit 20 at intervals of a predetermined pitch P of arrangement of the rolling elements 5, the respective output signals A and B of the strain sensors 22A and 22B come to represent waveform approximate to the sinusoidal wave cyclically varying, as shown by the solid line in FIG. 6C, at a period represented by the pitch P of arrangement of the rolling elements 5. Also, the respective output signals A and B are affected by influences brought about by temperature and/or influences brought about by hysteresis caused by the slippage between a knuckle 16 and a surface of a vehicle body fitting flange 1a (FIG. 1).

In the foregoing embodiment, since the estimating section 30 has been so designed and so configured that the force (the vertical load Fz, the load Fx due to become the driving force or the braking force and the axial load Fy) acting on the wheel support bearing assembly or between the vehicle wheel and the road surface (tire tread surface) is estimated by calculating and processing the difference between the respective output signals A and B of the two strain sensors 22A and 22B, the influences brought about by temperature and/or the influences brought about by the slippage between the knuckle and the flange surface, which appear in the output signals A and B of those two strain sensors 22A and 22B can be counterbalanced and, accordingly, the load acting on the wheel support bearing assembly and/or the tire tread surface can be detected accurately.

The calculation and processing of the difference between the respective output signals of the two strain sensors will now be described.

As a method of determining the amplitude of the difference signal or the value equivalent to the amplitude from the difference between the output signals A and B of the two strain sensors 22A and 22B by means of the calculation and processing, the method may be employed, in which the peak value is detected from the absolute value |A−B|. The absolute value |A−B| may be generated by means of a calculating circuit, but it may be calculated by means of a digital calculating process. Since the half-wave rectified waveform can be obtained during a rotating condition, either the peak value thereof held or a direct current component determined by means of a Low Pass Filter (LPF for short) may be treated as the amplitude equivalent value. Also, the effective value (squared average value) of the difference signal (A−B) may be used in the estimation calculation of the load as the amplitude equivalent value. In the digital calculation processing, the method may be employed, in which the amplitude equivalent value is calculated by setting one or more cycles of the vibration period of the difference signal to a calculation target time span and then detecting the maximum and minimum values within such time span.

In FIGS. 6A to 6C showing the constructional example of FIG. 5 as the sensor unit 20, the distance between the two contact fixing segments 21a, of the three contact fixing segments 21a arranged in the circumferential direction of the outer diametric surface of the outer member 1 which serves as the stationary member, positioned on respective ends of the row of arrangement thereof, is set to a value equal to the pitch P of arrangement of the rolling elements 5. In such case, the distance in the circumferential direction between the two strain sensors 22A and 22B, arranged at the respective positions intermediate between the neighboring contact fixing segments 21a is approximately ½ of the pitch P of arrangement of the rolling elements 5.

As a result, the respective output signals A and B of the two strain sensors 22A and 22B come to have a phase difference of about 180° relative to each other and the difference thereof will represent a value in which the influences brought about by temperature and/or the influences brought about by the slippage between the knuckle and the flange surface are sufficiently counterbalanced. Accordingly, the force (the vertical load Fz, the load Fx due to become the driving force or the braking force and the axial load Fy) acting on the wheel support bearing assembly or between the vehicle wheel and the road surface (tire tread surface) and estimated from the difference of the respective output signals A and B of the two strain sensors 22A and 22B by the estimating circuit 30 will become accurate, from which the influences brought about by temperature and/or the influence brought about by the slippage between the knuckle and the flange surface have been eliminated.

Figure 7A:
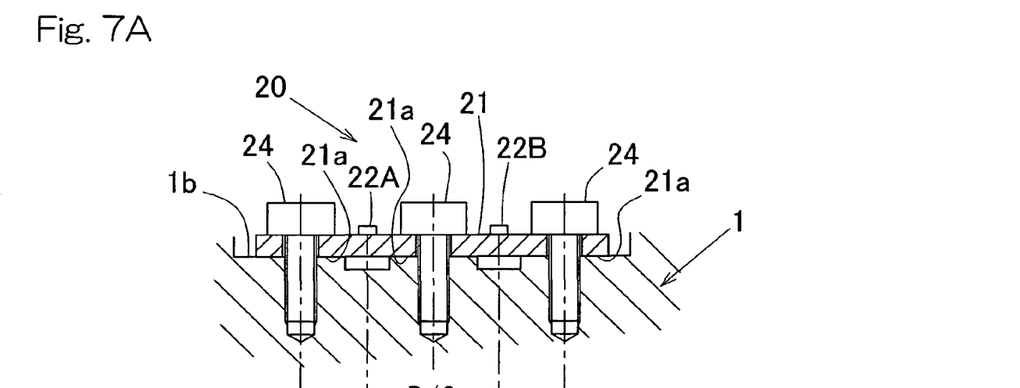
FIG. 7A is an explanatory diagram used to explain another manner of the output signal of the sensor unit being affected by the position of the rolling elements.
Figure 7B:
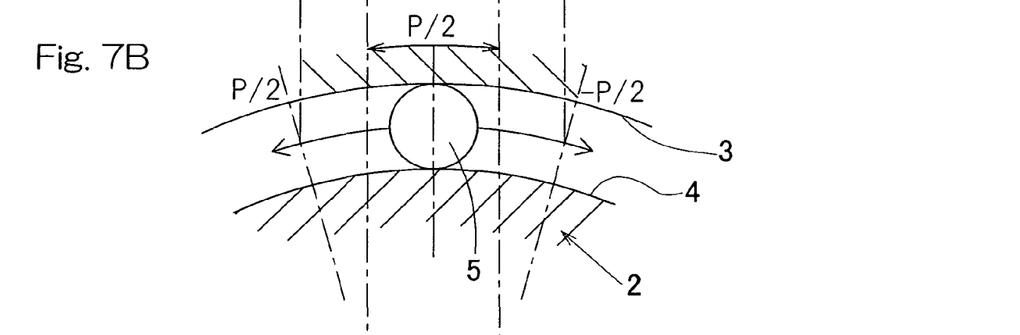
FIG. 7B is an explanatory diagram used to explain another manner of the output signal of the sensor unit being affected by the position of the rolling elements.
Figure 7C:
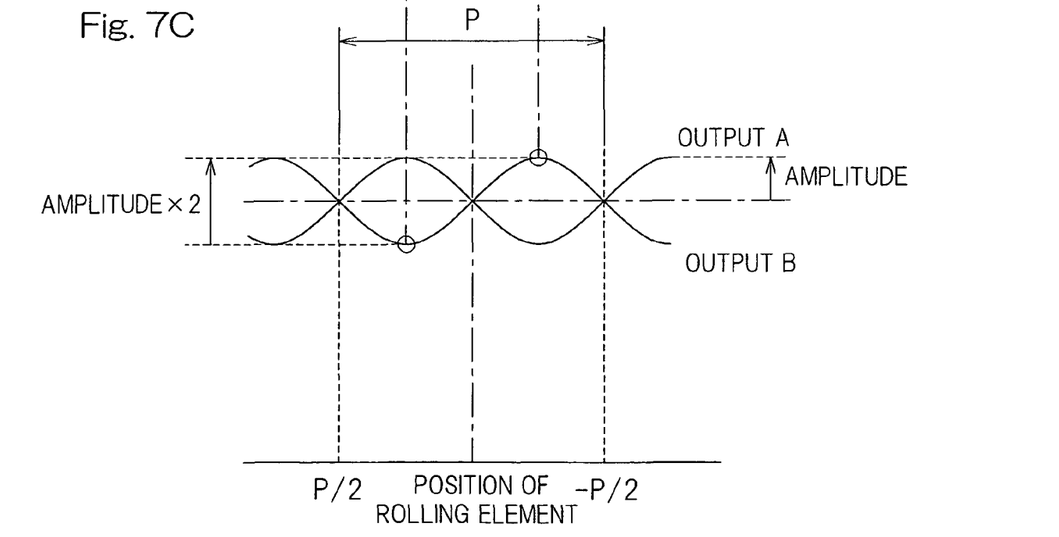
FIG. 7C is an explanatory diagram used to explain another manner of the output signal of the sensor unit being affected by the position of the rolling elements.

FIGS. 7A to 7C illustrate the example, in which in the sensor unit 20 of the structure shown in and described with reference to FIG. 5, the distance between the two strain sensors 22A and 22B in the circumferential direction is set to a value that is ½ of the pitch P of arrangement of the rolling elements 5. In this example, since the distance between the two strain sensors 22A and 22B in the circumferential direction is chosen to be ½ of the pitch P of arrangement of the rolling elements 5, the respective output signals A and B of those two strain sensors 22A and 22B have a phase difference of 180° and the difference thereof represents a value in which the influences brought about by temperature and/or the influence brought about by the slippage between the knuckle and the flange surface have been completely counterbalanced. Accordingly, the force (the vertical load Fz, the load Fx due to become the driving force or the braking force and the axial load Fy) acting on the wheel support bearing assembly or between the vehicle wheel and the road surface (tire tread surface) and estimated by the estimating circuit 30 becomes accurate, from which the influences brought about by temperature and/or the influence brought about by the slippage between the knuckle and the flange surface have been eliminated more reliably.

It is to be noted that in such case, the distance between the two strain sensors 22A and 22B in the circumferential direction may be a value equal to [½+n] times the pitch P of arrangement of the rolling elements 5, in which n represents an integer, or an approximation thereto. Even in such case, the difference between the respective outputs A and B of those two strain sensors 22A and 22B will represent a value in which the influences brought about by temperature and/or the influence brought about by the slippage between the knuckle and the flange surface have been counterbalanced.

Figure 8A:
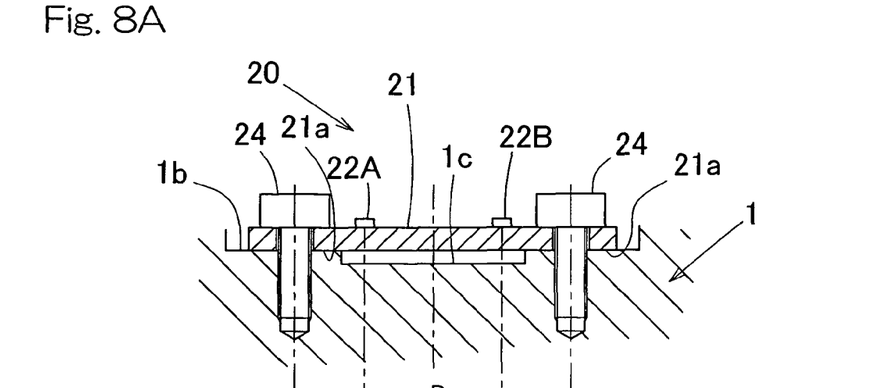
FIG. 8A is an explanatory diagram used to explain a further manner of the output signal of the sensor unit being affected by the position of the rolling elements.
Figure 8B:
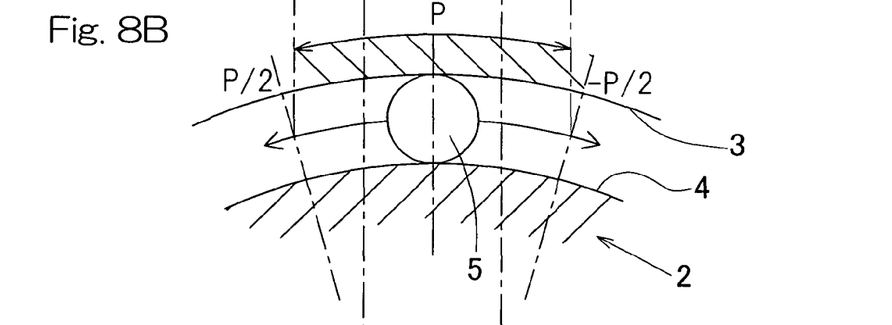
FIG. 8B is an explanatory diagram used to explain a further manner of the output signal of the sensor unit being affected by the position of the rolling elements.
Figure 8C:
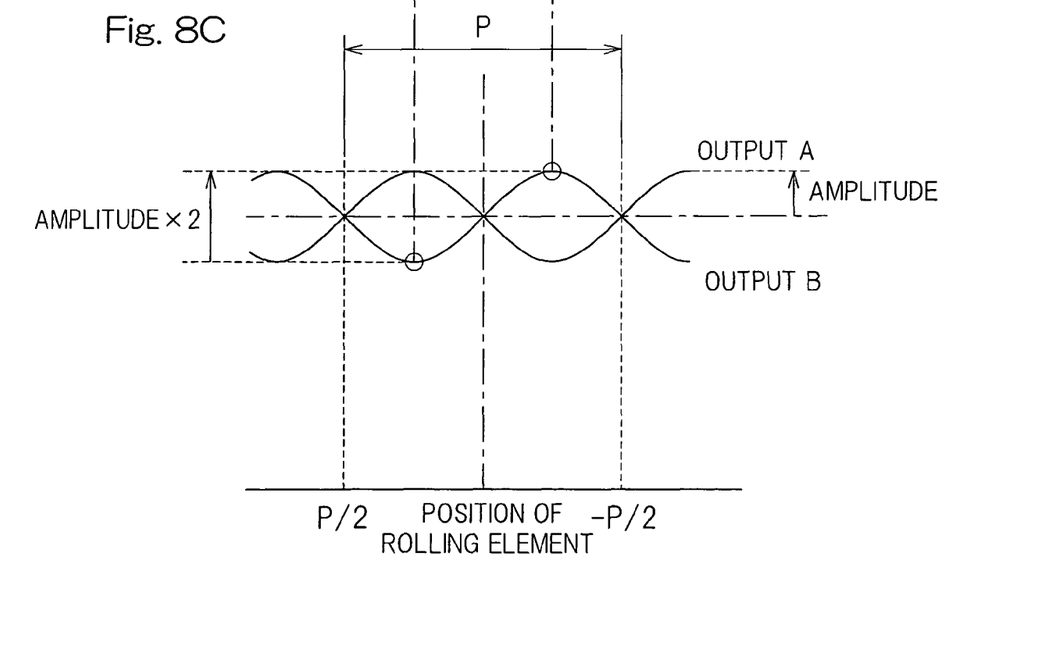
FIG. 8C is an explanatory diagram used to explain a further manner of the output signal of the sensor unit being affected by the position of the rolling elements.

FIGS. 8A to 8C illustrate a constructional example, in which in the constructional example of the sensor unit 20 shown in and described with reference to FIG. 5, one of the contact fixing segments 21a, which is held at the intermediate position, is dispensed with and, hence, only two contact fixing segments 21a are employed (FIG. 8A). In this case, as is the case with the example shown in and described with reference to FIGS. 6A to 6C, the distance between the two contact fixing segments 21a is set to a value equal to the pitch P of arrangement of the rolling elements 5. The distance in the circumferential direction between the two strain sensors 22A and 22B disposed between the two contact fixing segments 21a is set to a value approximately equal to ½ of the pitch P of arrangement of the rolling elements 5.

As a result, the respective output signals A and B of the two strain sensors 22A and 22B come to have a phase difference of about 180° relative to each other and the difference thereof will represent a value in which the influences brought about by temperature and/or the influences brought about by the slippage between the knuckle and the flange surface are sufficiently counterbalanced. Accordingly, it is possible for the estimating circuit 30 to further accurately estimate, from the difference between the respective output signals A and B of the two strain sensors 22A and 22B, the force (the vertical load Fz, the load Fx due to become the driving force or the braking force and the axial load Fy) acting on the wheel support bearing assembly or between the vehicle wheel and the road surface (tire tread surface) by eliminating more reliably the influences brought about by temperature and/or the influence brought about by the slippage between the knuckle and the flange surface.

Figure 9A:
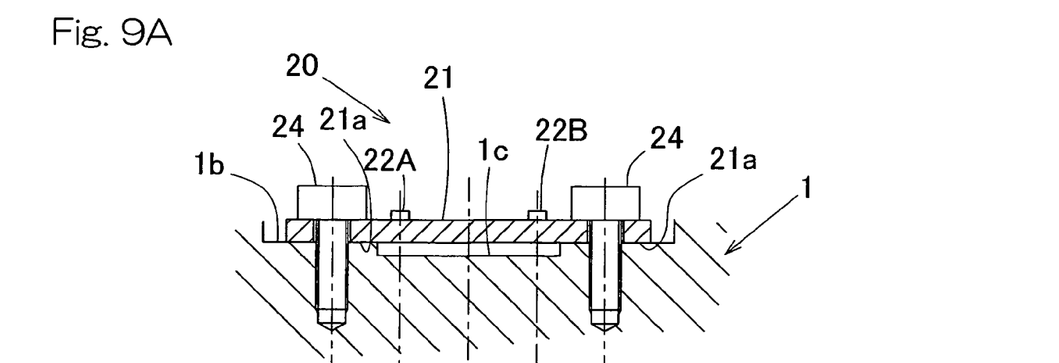
FIG. 9A is an explanatory diagram used to explain a still further manner of the output signal of the sensor unit being affected by the position of the rolling elements.
Figure 9B:
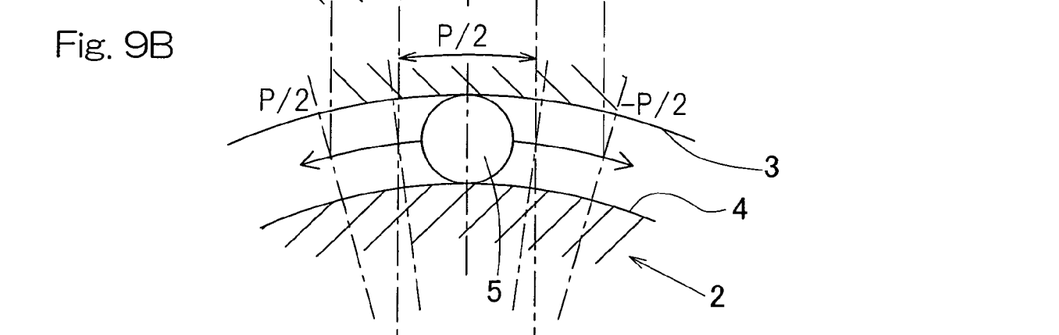
FIG. 9B is an explanatory diagram used to explain a still further manner of the output signal of the sensor unit being affected by the position of the rolling elements.
Figure 9C:
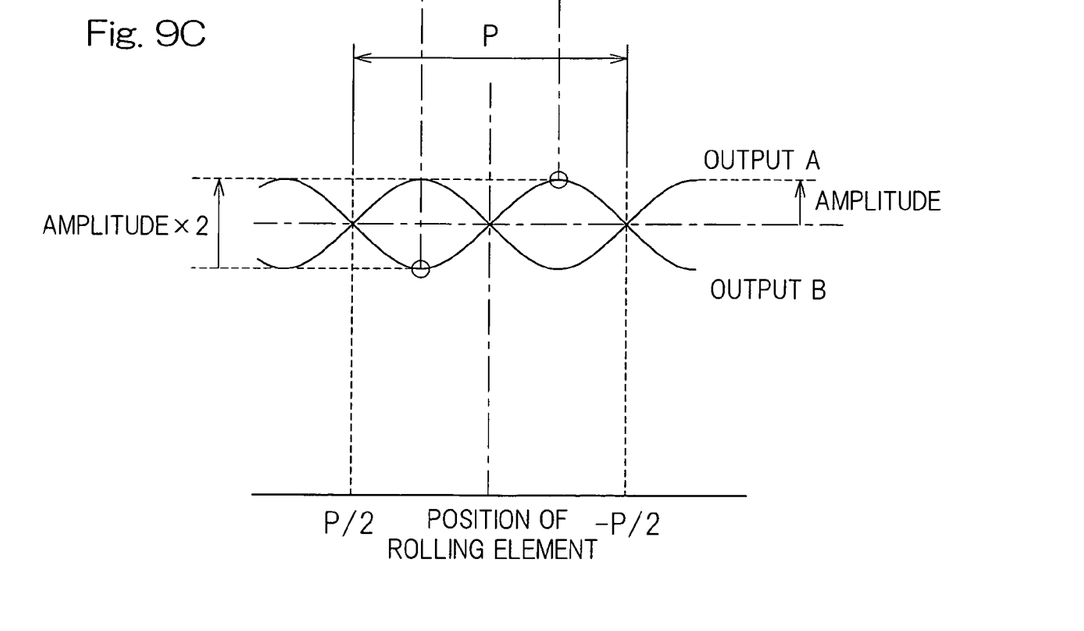
FIG. 9C is an explanatory diagram used to explain a still further manner of the output signal of the sensor unit being affected by the position of the rolling elements.

FIGS. 9A to 9C illustrate a case, in which in the sensor unit 20 employed in the constructional example shown in and described with reference to FIG. 8A, the distance between the two strain sensors 22A and 22B in the circumferential direction is set to ½ of the pitch P of arrangement of the rolling elements 5. Even in this example, as is the case with the example of FIGS. 7A to 7C, the respective output signals A and B of the two strain sensors 22A and 22B come to have a phase difference of about 180° relative to each other and the difference thereof will represent a value in which the influences brought about by temperature and/or the influences brought about by the slippage between the knuckle and the flange surface have been sufficiently counterbalanced. Accordingly, it is possible to further accurately eliminate the influences, brought about by temperature and/or the influence brought about by the slippage between the knuckle and the flange surface, from the force (the vertical load Fz, the load Fx due to become the driving force or the braking force and the axial load Fy) acting on the wheel support bearing assembly or between the vehicle wheel and the road surface (tire tread surface) and estimated by the estimating circuit 30.

It is to be noted that in such case, the distance between the two strain sensors 22A and 22B in the circumferential direction may be a value equal to [½+n] times the pitch P of arrangement of the rolling elements 5, in which n represents an integer, or an approximation thereto. Even in such case, the difference between the respective outputs A and B of those two strain sensors 22A and 22B will represent a value in which the influences brought about by temperature and/or the influence brought about by the slippage between the knuckle and the flange surface have been counterbalanced.

Other than those, in FIGS. 6A to 6C and FIGS. 7A to 7C, the distance between the two strain sensors 22A and 22B in the circumferential direction may be a value equal to [½+n] times the pitch P of arrangement of the rolling elements 5, in which n represents an integer, or an approximation thereto. Even in such case, the difference between the respective outputs of those two strain sensors 22A and 22B will represent a value in which the influences brought about by temperature and/or the influence brought about by the slippage between the knuckle and the flange surface have been counterbalanced.

When the load acts on the wheel support bearing assembly and/or between the wheel tire and the road surface, such load is applied also to the outer member 1, which serves as the stationary member, resulting in deformation. Since the three contact fixing segments of the strain generating member 21 in each of the sensor units 20, which has the cutout portions 21b, are fixed to the outer member 1 in contact therewith, the strain induced in the outer member 1 is transmitted to the strain generating member 21 in the form as amplified, and such strain is then detected by the strain sensors 22A and 22B with high sensitivity and, therefore, the load can be estimated from those output signals. In the instance as shown, the vertical load Fz and the axial load Fy can be estimated from the respective output signals of two of the sensor units 20, that are arranged at the top and bottom surface regions of the outer diametric surface of the outer member 1 whereas the load Fx brought about by the driving force or the braking force can be estimated from the respective output signals of the remaining two of the sensor units 20 that are arranged at the left and right positions on the outer diametric surface of the outer member 1.

In this case, the respective output signals A and B of the strain sensors 22A and 22B in each of the sensor units 20 are apt to be affected by the influence brought about by the temperature and/or the influences brought about by the slippage between the knuckle and the flange surface if they are not dealt with otherwise, but since the estimating circuit 30 can estimate the load (the vertical load Fz, the load Fx due to become the driving force or the braking force and the axial load Fy) acting on the wheel support bearing assembly and/or between the vehicle wheel tire and the road surface from the difference between the respective output signals of the strain sensors, the influence brought about by the temperature and/or the influences brought about by the slippage between the knuckle and the flange surface can be eliminated and the load can therefore be estimated with high sensitivity.

If the contact fixing segments 21a in the sensor units 20 fixed to the outer diametric surface of the outer member 1, which serves the stationary member, have different axial dimensions, the strains transmitted from the outer diametric surface of the outer member 1 to the strain generating member 21 through the respective contact fixing segments 21a differ from each other. In the foregoing embodiment, however, the contact fixing segments 21a in those sensor units 20 are so provided as to have the same axial dimensions and, therefore, the strains are apt to be concentrated on the strain generating members 21, resulting in increase of the detecting sensitivity.

Also, since in this embodiment, the strain generating member 21 in each of the sensor units 20 is prepared from a thin plate of a uniform width in schematic top plan representation or of a strip shaped configuration in schematic top plan representation having its opposite side edge portion formed with cutout portions 21b, the strain induced in the outer member 1 can be easily transmitted to the strain generating member 21 after having been amplified, the strain so transmitted are subsequently detected by the strain sensors 22A and 22B with high sensitivity, and the hysteresis induced in each of the respective output signals A and B of those strain sensors 22A and 22B are hence reduced to permit the load to be detected with high accuracy. Also, the shape of the strain generating member 21 comes to be simple and compact and low in cost.

In addition, since the corner area of each of the cutout portions 21b in the strain generating member 21 is rendered to be of an arcuately sectioned configuration, no strain will be concentrated on the corner area of each of the cutout portions 21b and the possibility of the plastic deformation taking place becomes low. Considering that no strain concentrate on the corner area of each of those cutout portions 21b, a variation of the strain distribution at detecting areas, that is, the sites of installation of the strain sensors 22A and 22B can be minimized and, hence, influences brought about by the sites of installation of the strain sensors 22A and 22B on the respective output signals A and B of the strain sensors 22A and 22B can be minimized. In this way, the load can be estimated with further accuracy.

If the detected load obtained from the sensor-equipped wheel support bearing assembly of the present invention is used in a vehicle control for controlling the automotive vehicle, it can contribute to the traveling stabilization of the automotive vehicle. Also, if this sensor-equipped wheel support bearing assembly is used, the load sensors can be installed compactly, rendering it to be excellent in mass productivity and the cost can be reduced.

In this embodiment hereinbefore described, respective portions of the vehicle body fitting flange 1a in the outer member 1, serving as the stationary member, at the locations circumferentially of the vehicle body fitting flange 1a, where the corresponding bolt holes 14 are defined, have been shown and described as protruding from such flange 1a in a direction radially outwardly beyond the remaining area thereof to define the projecting lugs 1aa. This results in positioning of the strain generating member 21 at a location spaced from each of the projecting lugs 1aa and, correspondingly, the hysteresis occurring in each of the output signals A and B of the strain sensors 22A and 22B can be reduced, allowing the load to be estimated with high accuracy.

Yet, in the foregoing embodiment, each of the sensor units 20 has been shown and described as arranged at the respective axial position, which defines the perimeter of the outboard rolling surface 3 out of the plural rows of the rolling surfaces 3 in the outer member 1, that is, the respective axial position, at which a relatively large space for installation is available and the amount of deformation is relatively large with the tire working force transmitted to the outer member 1 through the rolling elements 5. Accordingly, the detecting sensitivity is increased and the load can therefore be estimated with high accuracy.

Yet, since in the foregoing embodiment of the present invention, the sensor units 20 are provided at the upper and lower surface regions and the left and right surface regions of the outer diametric surface of the outer member 1 serving as the stationary member, the load can be estimated with high accuracy under any loaded condition. In other words, since as the load increases in a certain direction, the 180° phase difference appears between a portion, where the rolling element 5 are held in contact with the rolling surface 3, and a portion where they are not held in contact with the rolling elements 3, positioning of the sensor units 20 in 180° phase displaced relation in correspondence with that certain direction allows the load, applied to the outer member 1 through the rolling elements 5, to be transmitted assuredly to either one of the sensor units 20, which load can be subsequently detected by the strain sensors 22A and 22B.

It is to be noted that although in the foregoing embodiment of the present invention, the estimating section 30 has been shown and described as operable to estimate the load, acting on the wheel support bearing assembly, from the difference between the respective output signals A and B of the two or more strain sensors 22A and 22B, the estimating section 30 may be of a type capable of estimating the load, acting on the wheel support bearing assembly, with the utilization of the sum of the respective output signals A and B of additional two or more strain sensors 22A and 22B. As hereinabove described, if the respective output signals A and B of the two or more sensors 22A and 22B are summed together, influences brought about by the position of the rolling elements 5, which appear in the respective output signals A and B, can be counterbalanced and, therefore, not only can the influence brought about by temperature and/or the influence brought about by the slippage between the knuckle and the flange surface be eliminated, but also the load can be detected further precisely.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: Outer member
2: Inner member
3, 4: Raceway
5: Rolling elements
6: Retainer
20: Sensor unit
21: Strain generating member
21a: Contact fixing segment
21b: Cutout portion
22A, 22B: Strain sensor
30: Estimating section

What is claimed is:

1. A sensor-equipped wheel support bearing assembly for rotatably supporting a vehicle wheel relative to a vehicle body structure, comprising:
an outer member having an inner periphery formed with a plurality of rolling surfaces;
an inner member having an outer periphery formed with rolling surfaces opposed respectively to the rolling surfaces of the outer member;
a plurality of rows of rolling elements each row interposed between the rolling surfaces in the outer and inner members;
at least one load detecting sensor unit provided in one of the outer member and the inner member that serves as a stationary member, the load detecting sensor unit including a strain generating member, having two or more contact fixing segments fixed to the stationary member in contact therewith, and two or more sensors fitted to the strain generating member for detecting the strain induced in the strain generating member, the two or more contact fixing segments being so arranged as to be spaced from each other in a direction circumferentially of an outer diametric surface of the stationary member at a same axial position; and
an estimating section for estimating a load acting on the wheel support bearing assembly based on a difference between respective output signals from the two or more sensors,
wherein a distance between neighboring sensors of the two or more sensors in a circumferential direction of the outer diametric surface of the stationary member is chosen to be ½+n, where n represents an integer, times a pitch of arrangement of the rolling elements, whereby the two or more strain sensors are arranged on the strain generating member so that respective output signals of the strain sensors have a phase difference of 180°.

2. The sensor-equipped wheel support bearing assembly as claimed in claim 1, wherein the estimating section of a type capable of calculating amplitudes of respective output signals of the two or more sensors or values equivalent to those amplitudes from the difference between the respective output signals of the two or more sensors.

3. The sensor-equipped wheel support bearing assembly as claimed in claim 2, wherein the estimating section generates an absolute value of the signals from the difference between the output signals to utilize a peak value or a direct current component of the absolute value as the value equivalent to the amplitude of the respective output signal.

4. The sensor-equipped wheel support bearing assembly as claimed in claim 2, wherein the estimating section calculates an effective value of the signals from the difference between the output signals to utilize the effective value as the value equivalent to the amplitude of the respective output signal.

5. The sensor-equipped wheel support bearing assembly as claimed in claim 2, wherein the estimating section determines from the difference between the output signals, a maximum value and a minimum value within a time span of one or more cycles of vibration period to obtain the value equivalent to the amplitude of the respective output signal based on the maximum value and the minimum value.

6. The sensor-equipped wheel support bearing assembly as claimed in claim 1, wherein a distance between two contact fixing segments of those two or more contact fixing segments, which are positioned on respective ends of a circumferential row on an outer diametric surface of the stationary member is equal to a pitch of arrangement of the rolling elements.

7. The sensor-equipped wheel support bearing assembly as claimed in claim 1, wherein the sensor unit includes first, second and third contact fixing segments in the strain generating member and two sensors, those two sensors being fitted to a portion of the strain generating member between the neighboring first and second contact fixing segments and a portion of the strain generating member between the neighboring second and third contact fixing segments, respectively.

8. The sensor-equipped wheel support bearing assembly as claimed in claim 7, wherein a distance between the neighboring contact fixing segments or the neighboring sensors in a circumferential direction of the outer diametric surface of the stationary member is chosen to be ½+n, where n represents an integer, times a pitch of arrangement a the rolling elements or an approximation to such value.

9. The sensor-equipped wheel support bearing assembly as claimed in claim 1, wherein the strain generating member is prepared from a plate material having a generally strip shape in a plain view and having a cutout portion defined at a side edge portion of the strain generating member.

10. The sensor-equipped wheel support bearing assembly as claimed in claim 1, wherein the sensor units are disposed at top and bottom surface regions, and right and left surface regions of the outer diametric surface of the stationary member, which are located respectively in a vertical and horizontal directions relative to a tire tread surface.

11. The sensor-equipped wheel support bearing assembly as claimed in claim 1, wherein the estimating section is capable of estimating the load acting on the wheel support bearing assembly further by the utilization of sum of respective output signals of the two or more sensors.

12. The sensor-equipped wheel support bearing assembly as claimed in claim 1, wherein the sensor unit includes the three contact fixing segments and the two sensors; and
  wherein the three contact fixing segments are disposed at respective positions spaced from each other in the circumferential direction at the same axial position on the outer diametric surface of the stationary member, and a distance between the neighboring contact fixing segments or the neighboring sensors in a circumferential direction of the outer diametric surface of the stationary member is chosen to be ½+n, where n represents an integer, times a pitch of arrangement a the rolling elements or an approximation to such value.

\* \* \* \* \*

UNITED STATES PATENT AND TRADEMARK OFFICE
CERTIFICATE OF CORRECTION

| | |
|---|---|
| PATENT NO. | : 8,855,944 B2 |
| APPLICATION NO. | : 12/736412 |
| DATED | : October 7, 2014 |
| INVENTOR(S) | : Toru Takahashi et al. |

It is certified that error appears in the above-identified patent and that said Letters Patent is hereby corrected as shown below:

In the Claims

Column 16, Line 50, In Claim 8, delete "a the" and insert -- of the --, therefor.

Column 17, Line 12, In Claim 12, delete "a the" and insert -- of the --, therefor.

Signed and Sealed this
Fifth Day of May, 2015

Michelle K. Lee
*Director of the United States Patent and Trademark Office*